No. 853,268. PATENTED MAY 14, 1907.
A. SONANDER.
GRAIN METER.
APPLICATION FILED JUNE 7, 1906.
3 SHEETS—SHEET 1.
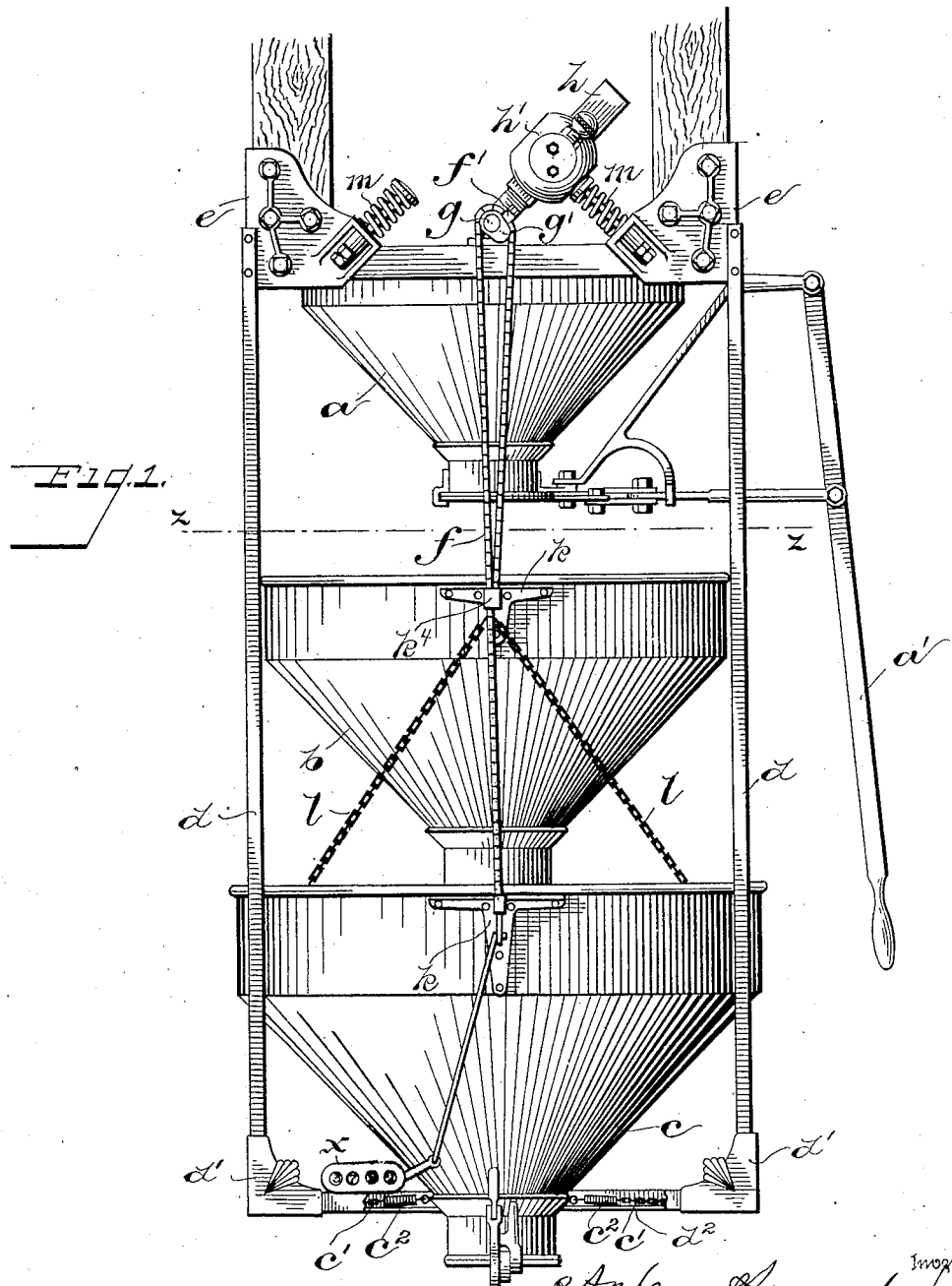

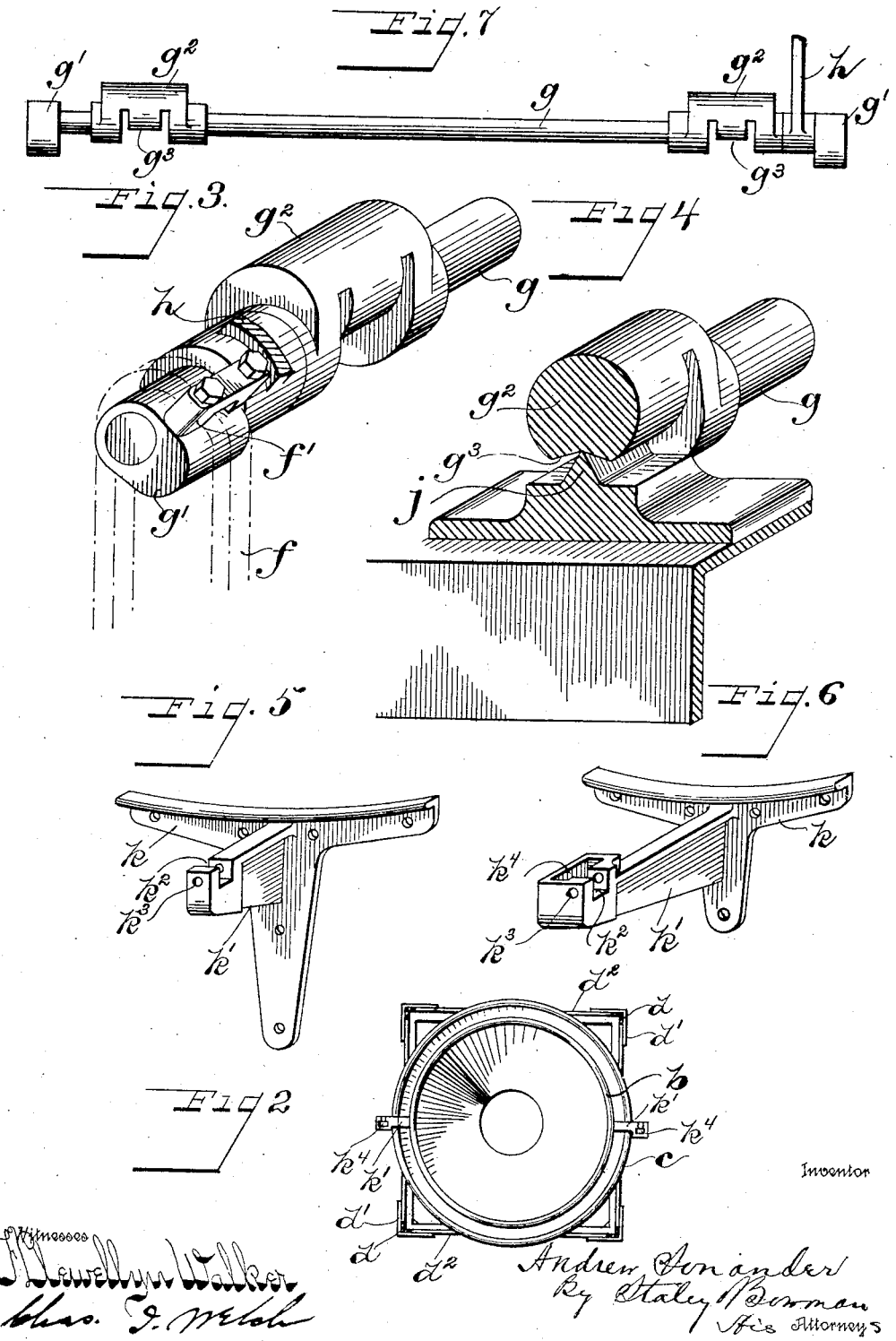

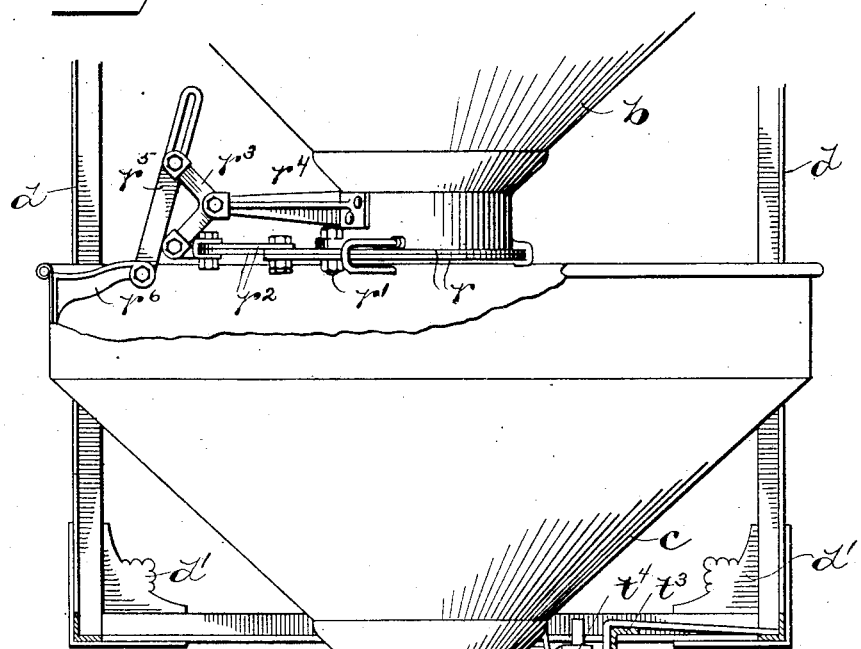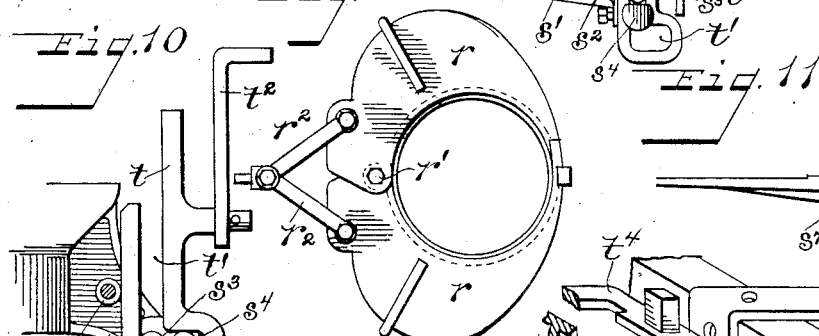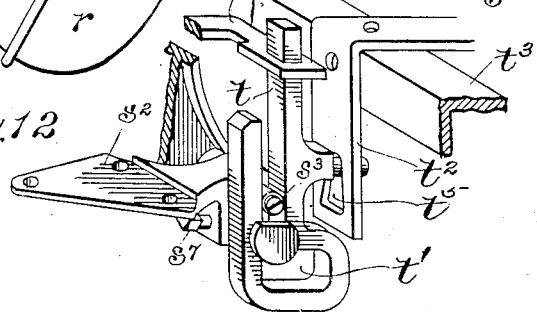

UNITED STATES PATENT OFFICE.

ANDREW SONANDER, OF SPRINGFIELD, OHIO, ASSIGNOR TO THE AMERICAN GRAIN METER COMPANY, OF SPRINGFIELD, OHIO, A CORPORATION OF OHIO.

GRAIN-METER.

No. 853,268.  Specification of Letters Patent.  Patented May 14, 1907.

Application filed June 7, 1906. Serial No. 320,511.

*To all whom it may concern:*

Be it known that I, ANDREW SONANDER, a citizen of the United States, residing at Springfield, in the county of Clark and State of Ohio, have invented certain new and useful Improvements in Grain-Meters, of which the following is a specification.

This invention relates to improvements in grain meters, and particularly to one adapted automatically to measure and register the quantity of grain or other free flowing granular material while it is being discharged from a source of supply into some receptacle or storage place. The construction is such that the amount of material passing through the grain meter is discharged in predetermined units of measure. These units of measure are uniform, and, as their weights can be ascertained, the device may also be used as a weighing machine adapted to weigh single or successive drafts. When so used, a common weighing apparatus is used in connection with the mechanism herein disclosed.

The objects of this invention are to simplify the construction and operation of grain meters, to improve the accuracy of the mechanism, and to construct an uncased meter, it being preferable that the operations of the mechanisms as well as the material being metered should be open to view.

The objects referred to are accomplished by the constructions shown in the accompanying drawings, in which Figure 1 is a side elevation of a device embodying my invention. Fig. 2 is a transverse sectional view on the line $z\ z$ in Fig. 1. Figs. 3 and 4 are perspective views partly in section of the rock-shaft. Figs. 5 and 6 are perspective views in detail of the attaching arms for the hopper-supporting devices. Fig. 7 is a side elevation of the rock-shaft and its bearings. Fig. 8 is a side elevation partly in section showing the arrangement of the gates or closing devices. Figs. 9, 10, 11 and 12 are detail views of the same.

Like parts are represented by similar characters of reference in the several views.

In the drawings, $a$, $b$ and $c$ represent hoppers which are arranged one above the other and adapted to receive the grain successively. The upper hopper, $a$, is the receiving hopper and it is to be remembered that in this grain meter while in operation there is a continuous flow of material through this hopper from the bin or other source of supply located above it, there being means for cutting off this flow of material operated by the hand-lever, $a'$, indicated in Fig. 1. The intermediate hopper, $b$, is a power-developing hopper, it being used simply to develop sufficient power to raise the measuring hopper, $c$, and close its door and momentarily thereafter to open its own gates. The lower hopper, $c$, is specifically the measuring hopper; but it is also used to develop sufficient power to raise the intermediate hopper, $b$, close its gates, and, momentarily thereafter, to open its own door, allowing the measured material to escape. It will be seen that the hoppers $c$ and $b$ are attached to and suspended from the opposite ends of the flexible connections, $f$, which are preferably shown in the nature of chains (Figs. 1 to 7); and these flexible connections pass over cams, $g'$, keyed to the rock-shaft, $g$; that to this rock-shaft is also keyed an arm or beam, $h$, which carries a movable counter-poise, $h'$, the adjustment of which toward or away from the rock-shaft determines the unit of measure. The arrangement of parts is such that the high part of the cam is used to regulate the perpendicular movements of the intermediate hopper, $b$, and the lower part of the cam is used to regulate the perpendicular movements of the lower hopper, $c$. These hoppers are all located within an open, light, rectangular frame, preferably constructed with angle-iron uprights, $d\ d$, attached at the top to the main supporting frame, $e\ e$, and connected at the bottom by corner pieces, $d'$, to the cross-pieces, $d^2$, which thus connect and brace the lower ends of the uprights, $d\ d$. This outer rectangular frame serves as the stationary support within which the hoppers are supported, the upper hopper, $a$, being stationarily held therein, while the intermediate hopper, $b$, and the measuring hopper, $c$, are both flexibly supported by said frame. The measuring hopper, $c$, may also be flexibly attached to the stationary open frame, $d\ d$, preferably by small springs, $c^2$, which springs operate to lessen the vibration of the parts. From this description it is apparent that the open frame, $d\ d$, constitutes the entire support for the stationary receiving hopper, $a$, and the intermediate and measuring hoppers, $b$ and $c$, while the parts are all exposed to view; and yet the connections are so arranged that it would be difficult to disturb the alinement of the hoppers or the connections thereto.

To insure a sensitive operation of the parts, means are provided for supporting the shaft, $g$, on knife-edge bearings, $j$, and this is accomplished by offsetting the shaft at each end and forming therewith a bearing-block, $g^2$, which has a beveled seat, $g^3$, which fits on the knife-edge bearing, $j$, the construction being such that the knife-edged bearing will be in direct line with the center of the shaft, $g$. This is preferably accomplished by making this bearing-block, $g^2$, of a separate casting attached to the shaft, $g$, which may be straight. It will be understood that each end of the shaft, $g$, is provided with a bearing of this kind, and a cam, $g'$, and to one end is attached the arm, $h$. To attach the flexible support, $f$, to the cam, $g'$, we preferably employ a yoke, $f''$, (see Fig. 3) adapted to fit over the flexible support and clamp it to the cam, $g'$, at a point preferably midway between the high and low points of said cam.

In operation, the material being metered flows continuously through the upper hopper, $a$. When sufficient material has accumulated in the intermediate hopper, $b$, to over-balance the counter-weights, the counterpoise and hopper, $c$, and thus to operate the rock-shaft, this hopper, $b$, drops and the lower hopper, $c$, rises with the following sequence of operations: Near the end of the upward movement of the lower hopper, $c$, its flap door is closed and locked; momentarily thereafter the downward movement of the intermediate hopper, $b$, causes its gates to open, allowing the material which has accumulated in this hopper to fall into the lower hopper, $c$. Thereafter the material flows continuously unchecked through this hopper, $b$, in a reduced stream from the upper hopper, $a$, into the lower hopper, $c$, until the latter receives the predetermined amount, which is regulated by the counterpoise on the rock-shaft; then this hopper, $c$, drops and hopper, $b$, rises with the following sequence of operations: Near the end of the upward movement of the hopper, $b$, its gates are closed, thus cutting off the flow of material into the hopper, $c$; and momentarily thereafter the flap door of hopper, $c$, is opened and the measured material is discharged. In the mean time the material has been flowing into the hopper, $b$, from the hopper, $a$, and the above operation will be repeated automatically until the flow of material is shut off at hopper, $a$. To effect these operations in their proper sequence it is apparent that the parts must be properly designed, constructed and adjusted and maintained in proper adjustment.

For attaching the supports to the hoppers, brackets, $k$, are employed, as shown in Figs. 5 and 6, each having an extended arm, $k'$, to which the flexible support, $f$, is attached. The arm for the measuring hopper, $c$, is provided in the outer end with a notch or depression, $k^2$, the opposite sides of which are perforated, as shown at $k^3$, to receive a pin which extends through the end of the flexible connection, $f$, and forms a pivoted connection thereto. The arm, $k'$, for the upper movable hopper, $b$, is similarly formed, and has in addition thereto a guide or way, $k^4$, through which the flexible connection passes to serve as a guide for the hopper, $b$, in its up and down movement in the measuring and discharging operation. The lower hopper is preferably braced from the flexible support by chains, $l$, extending outwardly from said support to the top of the hopper.

The closing devices for the lower ends of the respective movable hoppers may be of the same construction. However, inasmuch as the device of the intermediate hopper must cut off the flowing stream of material while that of the lower hopper is closed after the material ceases to flow from said hopper, and thereby does not oppose the downward force of the material, these closing devices are preferably of different construction as illustrated most clearly in Fig. 8. The closing device of the upper hopper consists essentially of two horizontal moving leaves, $r$ $r$, pivoted at $r'$, to a lug projecting from the neck of the hopper. The respective leaves, $r$ $r$, are connected by toggle links, $r^2$, with the lower end of a bell-crank-lever, $r^3$, pivotally connected to an extended arm, $r^4$, supported upon the hopper neck. The opposite end of the bell-crank-lever, $r^3$, engages a slotted connection in a link, $r^5$, pivotally secured at its lower end to a bracket, $r^6$, rigidly attached to the lower hopper.

In the position shown in Fig. 8, the gates or closing devices of the intermediate hopper are shown in their open position with the lower hopper, $c$, in its most elevated position and its gates closed. Upon the movement of the hoppers, as hereinbefore described, the lower hopper will be permitted by means of the slot in the link, $r^5$, a limited movement before operating the bell-crank lever, $r^3$, to close the gates of the upper hopper. As the hoppers approach the limit of their movement the upper end of the slot of the link, $r^5$, will engage the bell-crank, $r^3$, and move said bell-crank lever about its pivotal connection, which, through the toggle links, $r^2$, will move the leaves, $r$, to cut off the flowing grain. By the same movement of the lower hopper the door thereof will be opened to permit the discharge of the material contained therein.

The preferable construction of the gate or door for the lower hopper, $c$, is as follows: Extending laterally from the neck of the hopper is an arm, $s$, to which is hinged the flap or trap-door, $s'$, which preferably consists of a plate, adapted to close the lower end of the hopper neck, secured to a hinged portion, $s^2$. About the pivotal connection of the hinged portion, $s^2$, of the trap door is a small roller, $s^3$. There is also mounted on the portion, $s^2$, a second roller, $s^4$, which when the door is in its closed position will be in perpendicular relation with the roller, $s^3$. An additional roller, $s^5$, is provided upon the arm, $s$. These rollers engage with a member, $t$, having therein a cam-slot, $t'$. The member, $t$, is supported in a pendent portion, $t^2$, located on the cross-bar, $t^3$, of the rectangular frame. The upper portion of the member, $t$, projects through a keeper, $t^4$, secured to the hopper. The connection between the member, $t$, and the pendent portion, $t^2$, is slotted, as shown at $t^5$, (Fig. 12) to permit the member, $t$, a limited independent movement. The arrangement is such that as the lower hopper moves downward the rollers, $s^3$ $s^4$, will move down the slot, $t'$, until the roller, $s^4$, reaches the offset portion at the lower end of said slot, when it will be permitted to move laterally and allow the door, $s'$, to swing open, as shown in Fig. 10. The roller, $s^5$, has its bearing against the outer edge of the member, $t$, and serves merely as a guide or to hold the parts in proper relation. Upon the upward movement of the hopper, the roller, $s^4$, will engage the upper side of the offset portion of the slot, $t'$, and will cause the trap-door to swing up to its closed position when the roller, $s^4$, will enter the slot, $t'$, and hold it in this position until the hopper is again lowered. To provide for proper adjustment of the device, the stem, $s^6$, of the spindle upon which the roller, $s^4$, is mounted, is slightly flattened on opposite sides and projects through a slotted opening in the hinged portion, $s^2$, wherein it is secured by setscrews, $s^7$ and $s^8$.

On opposite sides of the rock-shaft, $g$, there are provided the usual bumpers, $m$ $m$, with which the counterpoise, $h'$, contacts in its movement from side to side.

The complete operation of the device is as follows: In order to start the flow of grain or other material through the receiving hopper, $a$, to the intermediate hopper, $b$, the hand-lever, $a'$, is operated to open the gates located at the discharge opening of said hopper, $a$. Thereupon the material flows continuously until the supply is exhausted, or until the hand-lever, $a'$, is again operated and the flow thereby stopped. The intermediate hopper, $b$, is normally in its elevated position, and, after a sufficient amount of material flows into said hopper, the weight thereof acting on the high parts of the cams, over-balances the counter weights—the counterpoise and the hopper, $c$—and operates to raise the measuring hopper, $c$, the intermediate hopper moving downward at the same time so that the two hoppers in reality approach one to the other. At the same time the counterpoise, $h'$, is pulled over to the opposite side, striking the buffer, $m$. As the measuring hopper, $c$, moves upward, the cut-off at the discharge opening of said hopper is operated to close said opening, as indicated in Fig. 12, and the opening is then kept closed and locked until the hopper reaches near its extreme downward position at the next operation of the meter. The cut-off connected to the bottom of the intermediate hopper, $b$, is operated at the end of its downward movement, and therefore subsequent to the closing of the measuring hopper, so that the material flows from the intermediate hopper, $b$, into the measuring hopper, $c$, after the bottom of the hopper, $c$, has been closed. When the measuring hopper, $c$, receives the predetermined amount of material it thereupon moves downwardly, and the operations occur in the sequence hereinbefore designated.

We have shown a form of register, $x$, applied to record the discharges of material from the measuring hopper, $c$, and, having the predetermined amount of one discharge, the register furnishes the factor by which the amount can be multiplied to ascertain the total.

Having thus described the invention, I claim:

1. In a machine of the character described, the combination of an uncased stationary frame, a rock shaft supported on said frame, a plurality of movable hoppers, flexible connecting devices located on opposite ends of said rock shaft, each flexible connecting device extending from one hopper over said shaft to one of the other hoppers, gates for said movable hoppers, and means for automatically operating said gates during the movements of said hoppers.

2. In a machine of the character described, the combination of an open stationary frame, a plurality of hoppers, the lowermost being flexibly connected at its lower part to said frame, a rock shaft supported on said frame and extending across the same, a single flexible connecting device extending from one of said hoppers over said rock shaft and connected at its opposite end to one of the other hoppers, there being a flexible connecting device at each side of the machine, substantially as specified.

3. In a machine of the character described, an uncased stationary frame, a rock shaft supported by said frame, a cam at each end of the shaft having enlarged faces thereon, a plurality of movable hoppers, and a single flexible connecting device extending over said cam connected at one end to the lowermost hopper and at the other end to one of the other hoppers, for the purpose specified.

4. The combination with a rock shaft having an offset at the end thereof, a bearing seat in said offset on a line with the center of said shaft, and a knife-edged bearing fitting to said bearing seat, a cam connected to said rock shaft, and a flexible connection from said cam to movable hoppers, whereby the weight of said hoppers is supported directly on said knife-edged bearings and the movement thereof caused to oscillate said shaft, substantially as specified.

5. The combination with a rock shaft having a weighted arm, an offset bearing on said rock shaft, a knife-edged bearing fitting in said bearing on a line with the center of said shaft, and a connection from the opposite sides of said shaft to two movable hoppers, one arranged above the other, whereby the raising and lowering of said hoppers will oscillate said shaft, and the weight of said hoppers be supported on said knife-edged bearings, substantially as specified.

6. The combination with a rock shaft having a weighted arm thereon, a cam at each end of said rock shaft, and two movable hoppers arranged below said rock shaft and supported from said cams by a flexible connection, one end of which is connected to one of said hoppers and the other end to the other of said hoppers, whereby said hoppers are suspended flexibly from said shaft, substantially as and for the purpose specified.

7. In a machine of the character described, a rock shaft having a weighted arm, said rock shaft being offset at each end and provided with bearing seats in said offset portions on a line with the center of said shaft, and knife-edged bearings on which said bearing seat is adapted to rest, cams on each end of said shaft beyond said offset bearings, and flexible connections on said cams, the opposite ends of which are attached to movable hoppers, one arranged above the other, substantially as and for the purpose specified.

8. The combination with a rock shaft of an upper and lower hopper, a flexible connection extending from one of said hoppers over said shaft and down to the other hopper, and a guide on said upper hopper through which the flexible connection extends, substantially as specified.

9. The combination with a stationary hopper, of a plurality of movable hoppers comprising a measuring hopper, and an intermediate power-developing hopper located above the same, said intermediate hopper being of less capacity than the lower measuring hopper, a rock shaft having cam faces thereon, and a flexible connection extending from one of said movable hoppers over said cam faces to the other movable hopper, and a guide for said flexible connection, substantially as specified.

10. In a measuring machine, the combination with suspended upper and lower hoppers, an outer uncased frame in which said hoppers are suspended, and a yielding attachment from one of said hoppers to said frame to prevent vibration of said hopper, substantially as specified.

11. The combination with an open stationary frame and a rock shaft, having cams, of movable hoppers, one arranged above the other, having extending arms, a flexible connection, one end of which is attached to the arms of one of said hoppers extending over said cams and connected to the arm of the other hopper, the arms on the lower hopper being provided with guides to guide said flexible connection, substantially as specified.

12. In a device as described, the combination of a hopper with a door closure device for said hopper, means for operating said door closure device, and a member having a cam engaged by said operating means, said cam being formed with guide-ways, said guide-ways being arranged so that the door operating means is out of frictional engagement intermediate its limits of movement.

13. In a device as described, a hopper, a closure device therefor, a plurality of projections on said closure, a cam having vertical and lateral guide-ways, and projections extending from said closure device, said projections extending within said guide-ways for moving the closure device, substantially as specified.

14. In a device as described, a hopper, a closure device, a member having a cam, means for giving the said member a limited movement independent of the closure device, a projection extending from said closure device and operated by said cam for the purpose of operating the closure device, substantially as specified.

In testimony whereof, I have hereunto set my hand this 31st day of May A. D. 1906.

ANDREW SONANDER.

Witnesses:
BORDER BOWMAN,
CHAS. I. WELCH.